United States Patent [19]

Simpson et al.

[11] Patent Number: 5,509,960
[45] Date of Patent: Apr. 23, 1996

[54] COMPOSITE PIGMENTARY MATERIAL

[75] Inventors: Leslie A. Simpson, Normanby; John Robb, Fairfield; Jonathan Banford, Hartburn; Paul F. Dietz, Hartlepool; John Temperley, Sedgefield, all of England

[73] Assignee: Tioxide Group Services Limited, United Kingdom

[21] Appl. No.: 59,754

[22] Filed: May 12, 1993

[30] Foreign Application Priority Data

Jun. 4, 1992 [GB] United Kingdom .................. 9211822

[51] Int. Cl.$^6$ ...................................................... C09C 1/36
[52] U.S. Cl. ........................................... 106/437; 106/417
[58] Field of Search .................................... 106/417, 437

[56] References Cited

U.S. PATENT DOCUMENTS

| | | | |
|---|---|---|---|
| 2,176,877 | 10/1939 | Alesandroni | 106/436 |
| 3,453,131 | 7/1969 | Fadner | 106/416 |
| 3,726,700 | 4/1973 | Wildt | 106/437 |
| 3,856,545 | 12/1974 | Ferrigno | 106/462 |
| 3,931,061 | 1/1976 | Kohne, Jr. et al. | 521/146 |
| 4,078,941 | 3/1978 | Bundy et al. | 106/409 |
| 4,117,191 | 9/1978 | Kurrle | 428/330 |
| 4,331,706 | 5/1982 | Kindrick | 427/74 |
| 4,569,920 | 2/1986 | Smith-Johannsen | 501/1 |
| 4,640,716 | 2/1987 | Cleland | 106/161 |
| 4,643,822 | 2/1987 | Parsonage | 209/8 |
| 4,738,726 | 4/1988 | Pratt et al. | 501/147 |
| 4,767,466 | 8/1988 | Nemeh et al. | 106/487 |
| 4,818,294 | 4/1989 | Raythatha et al. | 106/487 |
| 4,820,554 | 4/1989 | Jones et al. | 427/391 |
| 4,898,892 | 2/1990 | Melber et al. | 521/54 |
| 4,898,894 | 2/1990 | Melber et al. | 521/54 |
| 4,912,139 | 3/1990 | Melber et al. | 521/57 |
| 4,933,387 | 6/1990 | Wason | 524/450 |
| 5,011,862 | 4/1991 | Melber et al. | 521/54 |
| 5,078,793 | 1/1992 | Caton | 106/417 |
| 5,116,418 | 5/1992 | Kaliski | 106/419 |
| 5,152,835 | 10/1992 | Nemeh | 106/437 |
| 5,296,284 | 3/1994 | Durham | 106/416 |
| 5,344,487 | 9/1994 | Whalen-Shaw | 106/416 |

FOREIGN PATENT DOCUMENTS

| | | |
|---|---|---|
| 0377283 | 7/1990 | European Pat. Off. . |
| 0549163 | 6/1993 | European Pat. Off. . |
| 61-51061 | 3/1986 | Japan . |
| 62-195052 | 8/1987 | Japan . |
| 3-37207 | 2/1991 | Japan . |
| 4-332766 | 11/1992 | Japan . |
| 905091 | 5/1991 | South Africa . |
| 905093 | 5/1991 | South Africa . |
| 872149 | 7/1961 | United Kingdom . |
| 1352618 | 5/1974 | United Kingdom . |
| 1532521 | 11/1978 | United Kingdom . |
| 2102829 | 2/1983 | United Kingdom . |
| WO9001516 | 2/1990 | WIPO . |
| WO9101798 | 2/1991 | WIPO . |

OTHER PUBLICATIONS

R. R. Blakey et al., "Introductory Notes," *Pigment Handbook*, vol. 1 Properties and Economics, Second Edition, I–A–a Titanium Dioxide, pp. vii, 3, 32, 33 & 36, 1988. (No month).

M. R. Hornby, "The Particle Size Measurement of Titanium Dioxide Pigments," *Toxide Technical Divsion*, pp. 3–11, 1989. (no month).

R. Hogg et al., "Mutual Coagulation of Colloidal Dispersions," pp. 1638–1651, Sep. 27, 1965.

M. Okubo et al., "Analysis of 'Stepwise' Heterocoagulation Process of Small Cationic Polymer Particles Onto Large Anionic Polymer Particles Using Dynamic Light Scattering," *Colloid & Polymer Science*, vol. 269, pp. 125–130 (1991). (No month Available).

Kazufumi Kato et al., "Preparation of Latex Particles By Emulsion Polymerization With Amphoteric Surfactants and Interactions of Latex Particles Thus Prepared and Pigments," *Progress in Organic Coatings*, vol. 16, pp. 51–75 (1988). (No Month Available).

Hiroshi Kihira et al., "Kinetics of Heterocoagulation 1. A Comparison of Theory and Experiment," *Colloids and Surfaces*, vol. 64, pp. 317–324 (1992). (No month available).

R. Buscall et al., *Polymer Colloids*, pp. 89–90, 165–167 (1985). (No Month).

Stephen Harley, "Aggregate Morphology In Mixed Colloidal Dispersions," *Department of Physical Chemistry University of Bristol (Corporate Colloid Research Group, Runcorn)*, pp. 1–83 (Apr. 1990).

*Primary Examiner*—Mark L. Bell
*Assistant Examiner*—Scott L. Hertzog
*Attorney, Agent, or Firm*—Baker & Botts

[57] ABSTRACT

A composite particulate pigmentary material is disclosed which comprises an association of at least two chemically distinct materials in which the particles of one material carry a positive surface charge and the particles of the second material carry a negative surface charge and particles are held in association as a result of these surface charges. Also disclosed is a method for preparing composite particulate pigmentary material comprising forming aqueous dispersions of two particulate materials under conditions in which the surface charges of the particles of the two materials are of different signs and mixing the dispersions. Typical materials useful for preparing the composite include inorganic pigments, fillers and extenders and organic polymeric microspheres. The product is useful as a pigment in, for example, paints, inks, paper and plastics.

28 Claims, No Drawings

COMPOSITE PIGMENTARY MATERIAL

The invention relates to a pigmentary composite and in particular to a composite comprising an association of particles of at least two different materials.

It is well known that, the dispersion of a pigment within a pigmented system such as a paint film greatly affects the optical efficiency of the pigment. In particular the flocculation of pigment particles reduces the efficiency with which the particles scatter light.

It is an object of this invention to provide a composite material which possesses superior light scattering properties and in which flocculation of like particles is reduced in comparison to many conventional pigments.

According to the invention a composite particulate pigmentary material comprises an association of at least two chemically distinct materials wherein the particles of a first material carry a positive surface charge and the particles of a second material carry a negative surface charge the particles of the first material being held in association with the particles of the second material as a result of the said surface charges.

The effect of the surface charges on the particles of the composite is to produce a repulsion between like particles and an attraction between unlike particles and hence provide a structure in which flocculation of like particles is minimised but flocculates containing unlike particles are present. Such a structure leads to relatively good dispersion and improvements in light scattering efficiency.

Also according to the invention a process for producing a composite particulate pigmentary material comprises forming an aqueous dispersion of a first particulate material and an aqueous dispersion of a second, chemically distinct, particulate material the pH values of the dispersions so formed being such that the particles of both particulate materials carry a surface charge, the surface charge on the first particulate material being of opposite sign to the surface charge on the second particulate material and mixing said dispersions under conditions such that the mixing does not produce a reversal of the sign of the surface charge on one of the particulate materials.

In a preferred embodiment of the process of the invention an aqueous dispersion of a first particulate material is formed at a pH such that the particles of the first particulate material carry a positive surface charge, an aqueous dispersion of a second, chemically distinct, particulate material is formed at a pH substantially similar to the pH value of the dispersion of first particulate material wherein the particles of the second particulate material carry a negative surface charge and the dispersions so formed are mixed together.

The product of the invention is a composite material containing particles of at least two chemically distinct materials. In general, any particulate material can be used in the composite although, since the composite produced is pigmentary at least one of the materials will usually be a material normally considered to be a pigment. In particular inorganic pigments are preferred and, for example, such pigments are titanium dioxide pigments, zinc oxide pigments, antimony oxides, barium pigments, calcium pigments, zirconium pigments, chromium pigments, iron pigments, magnesium pigments, lead pigments, zinc sulphide and lithopone.

Other materials which can be used as one of the particulate materials are extenders or fillers such as silica, silicates, aluminates, sulphates, carbonates or clays. Non-pigmentary forms of the compounds mentioned above as pigments may also be used as one component of the composite.

Organic particulate materials are also useful in the product of the invention and in particular, polymeric particles generally referred to as microspheres are excellent components for the composite. A rather wide range of polymers is suitable for the formation of microspheres and a number of different types of microsphere is commercially available. For example microspheres composed of polystyrene, polyvinyl chloride, polyethylene, acrylic polymers and a number of copolymers are available and can be used in the product of this invention.

When microspheres are employed, they may comprise solid microspheres or the microspheres may contain voids or vesicles. Vesiculated microspheres can be used to contribute to the pigmentary efficiency of the composite according to the invention.

The most preferred embodiments of the invention are composites comprising an association of titanium dioxide particles with particles of an inorganic filler or extender or with polymeric microspheres. The titanium dioxide is preferably rutile titanium dioxide.

The preferred size of the particulate materials depends to some extent on the nature of the particles. Where one of the particulate materials is included in the composite for the purpose of providing the principal pigmentary effect then the average primary particle size will preferably be the size which provides optimum pigmentary properties for the material employed. For example, when a titanium dioxide pigment is used as one of the particulate materials then its average crystal size is preferably between about 0.05 and 0.5 micron. For rutile titanium dioxide the average crystal size is most preferably between 0.2 and 0.3 micron and for anatase titanium dioxide the average crystal size is most preferably between 0.1 and 0.35 micron.

Frequently one of the components of the composite is used to space out or support the particles included in the composite for their pigmentary effect. Such particles have been called below "non-pigmentary particles" although these particles may contribute some pigmentary effect to the composite.

The size of any non-pigmentary particles used as one of the components of the composite can vary over quite wide limits. Generally there is a size for these particles at which optimum pigmentary properties are demonstrated by the composite and this size will depend upon the nature of the pigmentary particles. For example, if the pigmentary particles are rutile titanium dioxide with an average crystal size between 0.2 and 0.3 micron then the average size of the non-pigmentary particles is preferably between 0.02 and 0.3 microns.

However, when the size of the non-pigmentary particles is not close to the size for optimum pigmentary properties the composites according to the invention nevertheless display improved pigmentary properties compared to similar pigmentary blends prepared by mixing without forming the structure of the composites of the invention. For example a composite prepared according to the process of the invention from pigmentary titanium dioxide and a filler such as clay enables a paint to be produced in which the contrast ratio is higher than the contrast ratio of a similar paint prepared from a mixture of titanium dioxide and clay.

Consequently useful composites according to the invention can be prepared from rutile titanium dioxide having an average crystal size between 0.2 and 0.3 micron and a second particulate material having an average particle size up to about 40 micron.

The ratio of the particulate materials used depends upon the relative size of the particles. For example, when the pigmentary particles are titanium dioxide having an average crystal size between 0.2 and 0.3 micron and the non-pigmentary particles have an average particle size of from 0.02 to 0.3 micron the ratio of titanium dioxide to non-pigmentary particles is preferably from 0.3:1 to 3:1 by volume. If, however, the non-pigmentary particles have an average size between 0.5 and 10 micron then the ratio of titanium dioxide to non-pigmentary particles is preferably from 0.05:1 to 1.5:1 by volume.

In the process of the invention the particulate materials which will become associated in the composite product of the invention are separately dispersed in water. These dispersions may be prepared by any suitable means. Most preferably the particulate material is stirred with water in the absence of a dispersing agent but it is often convenient to utilise a commercially available dispersion and such dispersions frequently contain dispersing agents. The presence of these dispersing agents usually does not prevent the use of such dispersions in the process of the invention.

Preferably the dispersion of particulate material is subjected to a milling step to break down any aggregates present and to optimise the degree of dispersion of the particles. The milling can be carried out by, for example high speed impeller mill, ball mill, sand mill or the use of ultrasound.

The pH value of the dispersion of one of the particulate materials is chosen so that the surface of the particles carries a positive charge. The actual pH value chosen will depend upon the nature of the particulate material and upon the nature of the surface of the particles. For example, a titanium dioxide particle having a coating of alumina will carry a substantial positive charge when dispersed at a pH below about 6 whereas the surface charge on a silica-coated titanium dioxide particle will be substantially positive below a pH of about 2.

In the process of the invention one of the dispersions described above contains particles having a positive surface charge and is mixed with another dispersion which contains particles carrying a negative surface charge. This other dispersion may be prepared at any pH, but, preferably, in order to simplify the mixing step of the process, the pH of the other dispersion is substantially similar to the pH of the dispersion in which the particles carry a positive surface charge.

When the pH values of the two dispersions are substantially similar the product of the invention is readily prepared by mixing these two dispersions whilst the mixture is agitated by any suitable means. Adequate mixing of the two dispersions is effected, for example, by stirring, recirculatory mixing or by exposing the mixture to the effect of ultrasonic vibrations. Typically, one of the dispersions is added to the other dispersion slowly, or the two dispersions are simultaneously introduced into an agitated mixing zone.

It may be necessary, for example when a dispersion has poor stability at a pH value chosen for mixing to prepare the two dispersions at substantially different pH values. When it is necessary to employ dispersions having substantially different pH values it is important to mix the dispersions under conditions such that the sign of the surface charge on either of the particulate materials is not reversed by any changes in pH which may occur during mixing. For example it may be necessary to add an acid or a base to adjust the pH during the mixing step.

For example, a suitable pH value for producing a composite from alumina-coated titanium dioxide is about 4 to 5. However, commercially available polymeric microspheres are often supplied as a dispersion at a pH of about 7 to 9. Nevertheless, a product according to this invention can be formed from titanium dioxide and polymeric microspheres by adding a commercial dispersion of microspheres to a dispersion of titanium dioxide at a pH of 4 to 5 whilst the pH of the resultant mixture is maintained in the range of 4 to 5 by the simultaneous addition of an acid.

The process of the invention yields a composite pigmentary material in the form of an aqueous dispersion and this is a convenient form for use in, for example, aqueous paints or paper coatings. However, the product may also be separated from the dispersion by, for example, filtration and dried to form a solid product.

The product of the invention can be used as a pigment in, for example, paints, inks, paper and plastics and displays improved pigmentary properties compared to a pigmentary system formed by simply mixing equivalent quantities of the components of the composite material.

The invention is illustrated by the following examples.

EXAMPLE 1

The pH of 1300 g of demineralised water was adjusted to 10 using sodium hydroxide solution. With stirring, 700 g of calcium carbonate (Snowcal 60) were added while the pH was maintained at 10. Stirring was continued after addition of calcium carbonate was complete.

The pH of 189.4 g of demineralised water was adjusted to pH 3 using dilute sulphuric acid. 102 g titanium dioxide pigment (Tioxide grade TR92) was added to the water which was stirred continuously while the pH was maintained at 3. Stirring was continued after all the pigment had been added.

The pH of the calcium carbonate slurry was adjusted to pH 6 using dilute sulphuric acid and the pH of the titanium dioxide pigment slurry was adjusted to 6 using sodium hydroxide solution. The pigment slurry was added to the calcium carbonate slurry with vigorous mixing. Once all the pigment has been added, stirring was continued for a further 10 minutes.

The resulting slurry was filtered and washed with hot water. After refiltering and drying overnight at 100° C. the dried composite material was crushed through a 2mm sieve and passed through an air fluid energy mill.

The resulting product was then tested in the following paint formulation.

|  | Parts by weight | |
|---|---|---|
|  | Standard Paint | Test Paint |
| Water | 38.80 | 38.80 |
| Hydroxyethyl cellulose (Cellobond QP4400H) | 0.50 | 0.50 |
| Ammonia | 0.10 | 0.10 |
| Sodium polyphosphate (Calgon) | 0.40 | 0.40 |
| Sodium salt of polycarboxylic acid (Orotan 731) | 0.40 | 0.40 |
| Nonionic surfactant (Triton CF10) | 0.10 | 0.10 |
| Butyl carbitol acetate | 2.00 | 2.00 |

|  | Parts by weight | |
|---|---|---|
|  | Standard Paint | Test Paint |
| Non-silicone defoaming agent (Nopco NS1) | 0.10 | 0.10 |
| Biodde (Acticide BX) | 0.10 | 0.10 |
| Calcined China Clay (Polester 200P) | 13.20 | 13.20 |
| Natural calcium carbonate (Snowcal 60) | 13.20 | — |
| Titanium dioxide (TR92) | 15.00 | 13.55 |
| Composite material (TR92/Snowcal 60) | — | 14.65 |
| Vinyl acetate/Veova 10 emulsion (Emultex VV536) | 16.10 | 16.10 |
| Particulate Volume Concentration | 64.3% |  |
| Titanium Dioxide Volume Concentration | 17.2% |  |
| Extender Volume Concentration | 47.1% |  |

TEST RESULT

|  | Standard | Test |
|---|---|---|
| Contrast Ratio at a Spreading Rate of 20 m²/l | 88.90 | 90.09 |

EXAMPLE 2

361 g of titanium dioxide pigment (Tioxide TR92) was dispersed, using a high speed impeller, in 353 g of water at pH 4.6 and the pH maintained at this level using dilute sulphuric acid. This pigment dispersion was slowly added over 30 minutes with gentle stirring, to 200 g of Lytron 2101 (a 52% aqueous dispersion of polystyrene particles) also adjusted to a pH of 4.6. During the addition, the pH of the mixture was maintained at 4.6 with the addition of sulphuric acid. When all the pigment slurry had been added, the mixture was stirred for a further 10 minutes and then the pH raised to 8.5 using dilute ammonium hydroxide.

Analysis showed a ratio of polystyrene particles to pigment of 1.14:1 by volume.

This product was then tested as a slurry in the following paint.

TEST RESULTS

|  | Standard | Test |
|---|---|---|
| $Y_B$ at a Spreading Rate of 20 m²/l | 81.24 | 82.77 |

EXAMPLE 3

181 g of titanium dioxide pigment (Tioxide TR92) was dispersed by ballmilling for 18 hours in 177 g of water at pH 4.6. To this pigment dispersion was added 200 g of Lytron 2101 (a 52% aqueous dispersion of polystyrene particles) also adjusted to a pH of 4.6. The mixture was then ballmilled for a further 16 hours during which the pH was maintained at 4.6 by the addition of sulphuric acid. After milling, the pH was raised to 8.5 using dilute ammonium hydroxide. Analysis showed a ratio of polystyrene particles to pigment of 2.27:1 by volume.

This product was then tested as a slurry in the following paint.

|  | Parts by weight | |
|---|---|---|
|  | Standard Paint | Test Paint |
| Water | 35.74 | 17.65 |
| Hydroxyethyl cellulose (Cellobond QP4400H) | 0.75 | 0.75 |
| Ammonia (0.88) | 0.34 | 0.34 |
| Sodium salt of polycarboxylic acid (Dispex N40) | 0.44 | 0.44 |
| Nonionic surfactant (Triton CF10) | 0.04 | 0.04 |
| Coalescing solvent (Texanol) | 1.62 | 1.62 |
| Defoaming agent (Foamester E75C) | 0.12 | 0.12 |
| Biocide (Nuosept 95) | 0.12 | 0.12 |
| Titanium dioxide (Tioxide TR92) | 19.60 | 2.45 |
| Lytron 2101 | 10.87 | — |
| Composite material (Lytron/TR92) | — | 46.12 |
| Vinyl acetate/Veova 10 emulsion (Vinamul 6955) | 30.34 | 30.34 |
| Particulate Volume Concentration | 40% |  |
| Pigment Volume Concentration | 20% |  |
| Polymer Bead Volume Concentration | 20% |  |

TEST RESULTS

|  | Standard | Test |
|---|---|---|
| Contrast Ratio at a Spreading Rate of 20 m²/l | 89.55 | 90.28 |

|  | Parts by weight | |
|---|---|---|
|  | Standard Paint | Test Paint |
| Water | 35.68 | 30.82 |
| Water | 35.68 | 30.82 |
| Hydroxyethyl cellulose (Cellobond QP4400H) | 0.65 | 0.65 |
| Ammonia (0.88) | 0.42 | 0.42 |
| Sodium salt of polycarboxylic acid (Dispex N40) | 0.53 | 0.53 |
| Nonionic surfactant (Triton CF10) | 0.04 | 0.04 |
| Coalescing solvent (Texanol) | 1.98 | 1.98 |
| Defoaming agent (Foamester E75C) | 0.14 | 0.14 |
| Biodde (Nuosept 95) | 0.14 | 0.14 |
| Titanium dioxide (Tioxide TR92) | 17.91 | 13.53 |
| Lytron 2101 | 5.51 | — |
| Composite material (Lytron/TR92) | — | 14.74 |
| Vinyl acetate/Veova 10 emulsion (Vinamul 6955) | 36.99 | 36.99 |
| Particulate Volume Concentration | 28% |  |
| Pigment Volume Concentration | 18% |  |
| Polymer Bead Volume Concentration | 10% |  |

| TEST RESULTS | | |
|---|---|---|
|  | Standard | Test |
| Contrast Ratio at a Spreading Rate of 20 m$^2$/l | 89.61 | 90.27 |
| $Y_B$ at a Spreading Rate of 20 m$^2$/l | 80.09 | 81.38 |

EXAMPLE 4

1 liter of water was adjusted to pH 3 using 2% aqueous hydrochloric acid. 800 g of calcined clay extender (Polestar 200P) was gradually added and the pH was maintained at below 4. The resulting slurry was found to contain 44.4% solids by weight and the final pH was 4.0. The slurry was milled using a Silverson high speed impeller for 30 minutes. 1000 g of a 48% dispersion of polystyrene beads (Lytton 2101) was separately reduced in pH to 4.0.

The extender slurry and the bead dispersion were mixed in an ultrasonic flowcell by pumping at relative rates of 20 parts Lytron dispersion to 30 parts Polestar slurry (by volume). The flowcell was exposed to ultrasound at a frequency of 20 kHz with a power output of 300 W. After 15 minutes the Polestar slurry reservoir was exhausted and the flow of Lytron was stopped. The pH of the product was raised to 8.5 using dilute ammonia. To ensure homogeneity the slurry was milled in a Silverson Stator/Rotor mill for 5 minutes. The slurry was analysed and was found to comprise (by weight); 57.4% water, 29.8% Polestar and 12.8% Lytron beads.

The product was observed by transmission electron microscopy which showed that the polystyrene beads were distributed as a layer around the particles of clay and no flocculates of polystyrene beads were observed.

EXAMPLE 5

A slurry of titanium dioxide pigment (Tioxide TR92) was prepared at a concentration of 50% solids by weight at a pH of 4.5 by milling the pigment in water at a pH of 4.5.

Slurries of composite pigment at three different volume ratios of polymeric bead to titanium dioxide (1.07:1, 1.54:1 and 2.11:1) were prepared by mixing portions of this slurry with a dispersion of hollow polymeric beads sold as Ropaque OP62 (Rohm and Haas) in an ultrasonic flowcell. The bead slurry was supplied at 38% solids by weight and 5% Fenopon EP110 (surfactant) was added and the pH adjusted to 4.5 before mixing with the titanium dioxide slurry. Agitation in the ultrasonic flowcell was achieved by using ultrasound at a frequency of 20kHz and a power output of 300 W.

The three slurries of composite pigments were incorporated into paints so that each paint had a total particulate volume concentration (p.v.c.) of 40%. Total p.v.c. represents the total percentage volume, in the dry paint film, occupied by composite pigment. The paints produced from the three pigment slurries described above therefore had bead volume concentrations (b.v.c.) of 20.7%, 24.3% and 27.2% respectively and TiO$_2$ volume concentrations of, 19.3%, 15.7% and 12.8% respectively.

The paints were prepared by mixing together all the ingredients other than the film forming emulsion (Vinamul 6955) and the composite pigment slurry. The film-forming emulsion followed by the composite pigment slurry was added to these mixed ingredients and incorporated by stirring. Three standard paints having similar compositions to the three paints containing composite pigments were prepared by conventional methods of paint manufacture. The paints had the following compositions. The Ropaque OP62 beads were used as a 38% dispersion and the composite pigment was used as a slurry prepared as described above. The compositions are, however, expressed on a dry weight basis with the water added with the beads and composite pigment being included in the quantity of water listed below.

|  | Parts by weight | | | | | |
| --- | --- | --- | --- | --- | --- | --- |
|  | 1.07:1 | | 1.54:1 | | 2.11:1 | |
| Volume Ratio polymeric bead:titanium dioxide | Standard Paint | Test Paint | Standard Paint | Test Paint | Standard Paint | Test Paint |
| Water | 214.40 | 214.00 | 202.50 | 202.56 | 193.30 | 193.25 |
| Hydroxyethyl cellulose (Cellobond QP4400H) | 3.00 | 3.00 | 3.00 | 3.00 | 3.00 | 3.00 |
| Ammonia (0.88) | 2.32 | 2.32 | 2.32 | 2.32 | 2.32 | 2.32 |
| Sodium salt of polycarboxylic acid (Dispex N40) | 2.96 | 2.96 | 2.96 | 2.96 | 2.96 | 2.96 |
| Nonionic surfactant (Triton CF10) | 0.24 | 0.24 | 0.24 | 0.24 | 0.24 | 0.24 |
| Coalescing solvent (Texanol) | 10.96 | 10.96 | 10.96 | 10.96 | 10.96 | 10.96 |
| Defoaming agent (Foamester E75C) | 0.80 | 0.80 | 0.80 | 0.80 | 0.80 | 0.80 |
| Biocide (Nuosept 95) | 0.80 | 0.80 | 0.80 | 0.80 | 0.80 | 0.80 |
| Titanium dioxide (Tioxide TR92) | 131.35 | — | 106.69 | — | 87.25 | — |
| Ropaque OP62 beads (dry weight) | 67.50 | — | 79.35 | — | 88.75 | — |
| Composite material (Ropaque/TiO$_2$ - dry weight) | — | 198.38 | — | 186.04 | — | 175.95 |
| Vinamul 6955 (55% emulsion) | 204.56 | 204.56 | 204.56 | 204.56 | 204.56 | 204.56 |
| Total particulate volume concentration | 40% | | 40% | | 40% | |
| Bead volume concentration | 20.7% | | 24.3% | | 27.2% | |
| TiO$_2$ volume concentration | 19.3% | | 15.7% | | 12.8% | |

TEST RESULTS

| PAINT | | CONTRAST RATIO @ 20 m$^2$/l | Y$_B$ @ 20 m$^2$/l | 60° Gloss |
| --- | --- | --- | --- | --- |
| 1.07:1 | Standard | 92.0 | 84.9 | 25% |
| 1.07:1 | Test | 92.4 | 85.4 | 23% |
| 1.54:1 | Standard | 91.3 | 83.8 | 27% |
| 1.54:1 | Test | 92.0 | 84.9 | 22% |
| 2.11:1 | Standard | 90.1 | 82.5 | 28% |
| 2.11:1 | Test | 91.1 | 83.8 | 23% |

EXAMPLE 6

Poly(styrene acrylate) beads were produced from a monomer mixture containing 50% styrene, 1% methacrylic acid and 49% methyl methacrylate by conventional emulsion polymerisation techniques. The polystyrene beads had a mean diameter of 0.06 micron.

800 g of titanium dioxide pigment (TIOXIDE TR92, Tioxide Group Limited) was added to 800ml of water and the pH was adjusted to 4.5. The resulting slurry was homogenised in a Silverson Stator/Rotor mill for 45 minutes. The pH of the aqueous suspension of poly(styrene acrylate) beads was also adjusted to 4.5.

The titanium dioxide slurry and poly(styrene acrylate) suspension were co-mixed by passing through an ultrasonic flowcell with a pigment to bead flow ratio of 1:1. During the mixing process the contents of the flowcell were subjected to ultrasound at a frequency of 200 kHz and a power output of 300 W. The resulting product was collected and adjusted to pH 8 (with dilute ammonia) before being Silverson milled for 20 minutes. The product was analysed and was found to contain water:bead:pigment in the proportions, by weight, 53.2: 10.3:36.5.

The above product was formulated into a paint having a particulate volume concentration of 40%. The paint was produced by mixing together all the ingredients other than the film-forming emulsion (Vinamul 6955) and the composite pigment slurry and subsequently adding, firstly, the film-forming emulsion and, secondly, the composite pigment slurry and mixing by stirring. Two standard paints were produced to demonstrate the advantage of the composite pigment in this case. Both contained the same bead and titanium dioxide volume concentrations as the test paint but neither contained composite pigment. In the first, (I), the beads used were from the same batch of poly(styrene acrylate) beads used to prepare the composite pigment and in the second, (II), the beads used were commercial polystyrene beads (Lytron 2101).

The paints had the following formulations in which the quantities of Lytron 2101 beads, poly(styrene acrylate) beads and composite pigment have been expressed on a dry weight basis as in Example 5.

|  | Parts by weight | | |
| --- | --- | --- | --- |
|  | Test Paint | Standard Paint(I) | Standard Paint(II) |
| Water | 212.00 | 212.00 | 229.40 |
| Hydroxyethyl cellulose (Cellobond QP4400H) | 3.00 | 3.00 | 3.00 |
| Ammonia (0.88) | 2.32 | 2.32 | 2.32 |
| Sodium salt of polycarboxylic acid (Dispex N40) | 2.96 | 2.96 | 2.96 |
| Nonionic surfactant (Triton CF10) | 0.24 | 0.24 | 0.24 |
| Coalescing solvent (Texanol) | 10.96 | 10.96 | 10.96 |
| Defoaming agent (Foamester E75C) | 0.80 | 0.80 | 0.80 |
| Biocide (Nuosept 95) | 0.80 | 0.80 | 0.80 |
| Titanium dioxide (Tioxide TR92) | — | 127.90 | 127.90 |
| Poly(styrene acrylate) beads (dry weight) | — | 92.50 | — |
| Lytron 2101 beads (dry weight) | — | — | 74.55 |

-continued

|  | Parts by weight | | |
| --- | --- | --- | --- |
|  | Test Paint | Standard Paint(I) | Standard Paint(II) |
| Composite pigment | | | |
| (Poly(styrene acrylate)/TiO$_2$) (dry weight) | 220.41 | — | — |
| Vinamul 6955 (55%) | 204.56 | 204.56 | 204.56 |
| Particulate Volume Concentration | | 40% | |
| Pigment Volume Concentration | | 19.4% | |
| Polymer Bead Volume Concentration | | 20.6% | |

| TEST RESULTS | | | |
| --- | --- | --- | --- |
|  | Standard (I) | Standard (II) | Test |
| Contrast Ratio at 20 m$^2$/l | 89.5 | 89.3 | 90.6 |
| Y$_B$ at 20 m$^2$/l | 81.2 | 80.9 | 82.4 |
| Gloss (60*) | 39% | 51% | 47% |

The paints prepared had the following compositions in which the weights of vinyl acetate/VeoVa beads and composite pigment have been expressed on a dry weight basis as in Example 5.

|  | Parts by weight | |
| --- | --- | --- |
|  | Standard Paint | Test Paint |
| Water | 223.20 | 223.19 |
| Hydroxyethyl cellulose (Cellobond QP4400H) | 3.00 | 3.00 |
| Anunonia (0.88) | 2.32 | 2.32 |
| Sodium salt of polycarboxylic acid (Dispex N40) | 2.96 | 2.96 |
| Nonionic surfactant (Triton CF10) | 0.24 | 0.24 |
| Coalescing solvent (Texanol) | 10.96 | 10.96 |
| Defoaming agent (Foamester E75C) | 0.80 | 0.80 |
| Biocide (Nuosept 95) | 0.80 | 0.80 |
| Titanium dioxide (Tioxide TR92) | 101.00 | — |
| Vinyl acetate/VeoVa emulsion (dry weight) | 102.81 | — |
| Composite pigment (polymer emulsion/TiO$_2$ - dry weight) | — | 203.81 |
| Vinamul 6955 (55%) | 204.56 | 204.56 |

EXAMPLE 7

A 53% by weight aqueous dispersion of titanium dioxide pigment (TIOXIDE TR92, Tioxide Group Limited) was produced. The slurry was adjusted to pH 4.5 and milled in a high shear mill to effect thorough dispersion. An experimental grade vinyl acetate/VeoVa polymer emulsion, with a natural pH of 4.0 and an average particle size of 0.075 micron, was added to the pigment slurry. The addition was conducted by passing the two fluids simultaneously into a cell at relative flow rates of 10.5 parts polymer emulsion to 1 part pigment slurry by volume. In order to break up coagulates, the resulting slurry was dispersed in a high shear mixer for five minutes. The pH was adjusted to 8.

The composition of the slurry (on a weight basis) was found to be 33.5:15.0:51.5, TiO$_2$:Bead:Water. The bead to pigment ratio (volume basis) was 1.69:1. The slurry was incorporated into a high quality exterior matt formulation for evaluation using the same method as Example 5. In this formulation, the TiO$_2$ volume concentration was 14.88% while the vinyl acetate/VeoVa bead volume concentration was 25.11%. The paint had a volume solids content of 30.01%. A paint of similar composition, but made in a manner consistent with conventional paint manufacture, was produced to act as a standard.

| TEST RESULTS | | |
| --- | --- | --- |
|  | STANDARD | TEST |
| 60° Gloss | 61% | 66% |
| Spreading Rate (See note) | 6.87 m$^2$/l | 7.49 m$^2$/l |
| Scattering Factor | 3.907 | 4.181 |

NOTE

Spreading rate is the area which can be covered by 1 liter of paint whilst ensuring a specified level of obliteration (in this test, a contrast ratio of 98).

EXAMPLE 8

The pH value of a batch of 200 g of a dispersion of polystyrene beads (Lytron 2101) at 48% solids was reduced from 9 to 7. Separately, 187.5 g lead carbonate (white lead pigment, ALMEX from Associated Lead) was dispersed at a concentration of 576 grams per liter in water by milling with a Silverson mill for 20 minutes. The pH of this slurry was adjusted to a value of 6.5 and it was then added slowly in a beaker with stirring to the Lytron bead dispersion. The pH of the resulting slurry of composite pigment was raised to a value of 8.5 with dilute ammonia. The composition of this composite pigment slurry was 174.1 g lead carbonate, 96 g (dry weight basis) Lytron beads and 378 g water.

For comparison a standard slurry having a similar composition was prepared by mixing a slurry of lead carbonate at a pH of 8 with a 48% slurry of Lytron 2101 beads at a pH of 8.

Paints were prepared from the two slurries using the formulation below in which the weights of the lead carbonate, Lytron beads and composite pigment are given on a dry weight basis as in Example 5.

|  | Parts by weight | |
|---|---|---|
|  | Standard Paint | Test Paint |
| Water | 235.85 | 235.85 |
| Hydroxyethyl cellulose (Cellobond QP4400H) | 1.75 | 1.75 |
| Ammonia (0.88) | 2.32 | 2.32 |
| Sodium salt of polycarboxylic acid (Dispex N40) | 2.96 | 2.96 |
| Nonionic surfactant (Triton CF10) | 0.24 | 0.24 |
| Coalescing solvent (Texanol) | 10.96 | 10.96 |
| Defoaming agent (Foamester E75C) | 0.80 | 0.80 |
| Biodde (Nuosept 95) | 0.80 | 0.80 |
| Lead carbonate (dry weight) | 100.80 | — |
| Lytron 2101 beads (dry weight) | 115.70 | — |
| Composite pigment - dry weight | — | 216.50 |
| Vinamul 6955 (55%) | 204.56 | 204.56 |

The test paint was well dispersed with few particles above 5 micron and gave a smooth film when drawn down. The appearance of the standard paint when drawn down, however, was marred by the presence of many agglomerates/aggregates of around 0.5 millimeters.

We claim:

1. A composite particulate pigmentary material comprising an aqueous dispersion of composite particles comprising an association of at least two chemically distinct materials wherein the particles of a first material carry a positive surface charge and the particles of a second material carry a negative surface particles of a second material carry a negative surface charge, the charge, the particles of the first material being held in association with particles of the second material as a result of said surface charge wherein said aqueous dispersion contains at least 35% by weight of said composite particles, said first material is an inorganic pigment or extender having an average particle size in the range of 0.02 to 0.5 micron and at least one of said positive surface charges and said negative surface charges is generated by preparing an aqueous dispersion of said first material or said second material at a pH value which produces said surface charge.

2. A composite particulate pigmentary material according to claim 1 in which the inorganic pigment is selected from the group consisting of titanium dioxide pigments, zinc oxide pigments, antimony pigments, barium pigments, calcium pigments, zirconium pigments, chromium pigments, iron pigments, magnesium pigments, lead pigments, zinc sulphate and lithopone.

3. A composite pigmentary material according to claim 1 in which said extender is selected from the group consisting of silica silicates, aluminates, sulphates, carbonates and clays.

4. A composite pigmentary material according to claim 1 in which said second material is an organic polymer.

5. A composite particulate pigmentary material according to claim 4 in which the organic polymer is selected from the group consisting of polystyrene, polyvinyl chloride, polyethylene, acrylic polymers and copolymers.

6. A composite particulate pigmentary material according to claim 4 in which particles of the organic polymer comprise microspheres containing voids or vesicles.

7. A composite particulate pigmentary material according to claim 1 comprising an association of titanium dioxide particles with particles of an inorganic material selected from the group consisting of fillers and extenders.

8. A composite particulate pigmentary material according to claim 1 comprising an association of titanium dioxide particles with polymeric microspheres.

9. A composite particulate pigmentary material according to claim 1 comprising an association of particles of titanium dioxide with particles of a chemically distinct material in which the titanium dioxide is rutile titanium dioxide.

10. A composite particulate pigmentary material according to claim 1 comprising an association of a titanium dioxide pigment and a chemically distinct material in which the titanium dioxide pigment has an average crystal size between 0.05 and 0.5 micron.

11. A composite particulate pigmentary material according to claim 10 in which the titanium dioxide is anatase titanium dioxide and the average crystal size is between 0.1 and 0.35 micron.

12. A composite particulate pigmentary material according to claim 10 in which the titanium dioxide pigment is rutile titanium dioxide and the averages crystal size is between 0.2 and 0.3 micron.

13. A composite particulate pigmentary material according to claim 12 comprising an association of rutile titanium dioxide and a chemically distinct material, said chemically distinct material having an average particle size up to 40 microns.

14. A composite particulate pigmentary material according to claim 13 in which the chemically distinct material has an average particle size between 0.02 and 0.3 micron.

15. A composite particulate pigmentary material according to claim 14 in which the titanium dioxide and the chemically distinct material are present in relative amounts of from 0.3 to 3 parts of titanium dioxide to 1 part of chemically distinct material by volume.

16. A composite particulate pigmentary material according to claim 13 in which the chemically distinct material has an average particle size between 0.5 and 10 micron and the titanium dioxide and chemically distinct material present are present in relative amounts of from 0.05 to 1.5 parts of titanium dioxide to 1 part of chemically distinct material by volume.

17. A composite particulate pigmentary material comprising an aqueous dispersion of composite particles said composite particles comprising an association of at least chemically distinct materials wherein the particles of a first material carry a positive surface charge and the particles of a second material carry a negative surface charge, the particles of the first material being held in association with the particles of the second material as a result of said surface charge, wherein said aqueous dispersion contains at least 35% by weight of said composite particles, said first material is an organic polymeric material having an average particle size in the range of 0.02 to 0.5 micron and at least one of said positive surface changes and said negative surface charges is generated by preparing an aqueous dispersion of said first material or said second material at a pH value which produces said surface charge.

18. A composite pigmentary material according to claim 17 in which said second material is selected from the group consisting of inorganic pigments and extenders.

19. A composite pigmentary material according to claim 17 in which the organic polymeric material is selected from the group consisting of polystyrene, polyvinyl chloride, polyethyl, acrylic polymers and copolymers.

20. A composite pigmentary material according to claim 17 in which the particles of the organic polymeric material comprise microspheres containing voids or vesicles.

21. A composite pigmentary material comprising an aqueous dispersion of composite particles produced by a process which comprises forming an aqueous dispersion of particles of a first material and an aqueous dispersion of a second, chemically distinct, material, the pH values of the dispersions so formed being such that the particles of both materials carry a surface charge, the surface charge on the particles of the first material being of opposite sign to the surface charge on the particles of the second material wherein at least one of said dispersions is formed in the substantial absence of a dispersing agent, and mixing said dispersions, under conditions such that the mixing does not produce a reversal of the sign of the surface charge on one of the materials, to produce an aqueous dispersion of composite particles, said composite particles comprising an association of particles of said first material and particles of said second material, wherein the particles of said first material are held in association with the particles of said second material as a result of said surface charges and subsequently raising the pH of said dispersion of composite particles to a value of up to about 8.5.

22. A composite pigmentary material according to claim 21 in which the dispersion of composite particles contains at least about 35% by weight of said composite particles.

23. A composite particulate pigmentary material according to claim 18 in which the inorganic pigment is selected from the group consisting of titanium dioxide pigments, zinc oxide pigments, antimony pigments, barium pigments, calcium pigments, zirconium pigments, chromium pigments, iron pigments, magnesium pigments, lead pigments, zinc sulphate and lithopone.

24. A composite pigmentary material according to claim 18 in which said extender is selected from the group consisting of silica, silicates, aluminates, sulphates, carbonates and clays.

25. A composite pigmentary material according to claim 17 in which said second material is an organic polymer.

26. A composite particulate pigmentary material according to claim 17 comprising an association of titanium dioxide particles with polymeric microspheres.

27. A composite particulate pigmentary material according to claim 17 comprising an association of particles of titanium dioxide with particles of a chemically distinct material in which the titanium dioxide is rutile titanium dioxide.

28. A composite particulate pigmentary material according to claim 17 comprising an association of a titanium dioxide pigment and a chemically distinct material in which the titanium dioxide pigment has an average crystal size between about 0.05 and about 0.5 micron.

* * * * *